(12) United States Patent
Nasca et al.

(10) Patent No.: US 10,889,220 B2
(45) Date of Patent: Jan. 12, 2021

(54) VEHICLE SEAT INCLUDING A HEAD RESTRAINT INCORPORATING DEPLOYABLE PILLOW

(71) Applicant: GM GLOBAL TECHNOLOGY OPERATIONS LLC, Detroit, MI (US)

(72) Inventors: Jeff E. Nasca, Bloomfield Township, MI (US); Paul W. Alexander, Ypsilanti, MI (US); Eric M. Clough, Beverly Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 30 days.

(21) Appl. No.: 16/246,625

(22) Filed: Jan. 14, 2019

(65) Prior Publication Data

US 2020/0223340 A1 Jul. 16, 2020

(51) Int. Cl.
| | | |
|---|---|---|
| *A47C 1/10* | (2006.01) | |
| *B60N 2/879* | (2018.01) | |
| *B60N 2/868* | (2018.01) | |
| *B60N 2/885* | (2018.01) | |
| *B60N 2/90* | (2018.01) | |
| *B60N 2/80* | (2018.01) | |

(52) U.S. Cl.
CPC ............ *B60N 2/879* (2018.02); *B60N 2/868* (2018.02); *B60N 2/885* (2018.02); *B60N 2/914* (2018.02); *B60N 2002/899* (2018.02)

(58) Field of Classification Search
CPC ........ B60N 2/832; B60N 2/914; B60N 2/806; B60N 2/865; B60N 2/856; B60N 2/874
USPC ................... 297/403, 408, 406, 391, 216.12; 280/730.1
See application file for complete search history.

(56) References Cited

U.S. PATENT DOCUMENTS

| | | | | |
|---|---|---|---|---|
| 4,865,388 A | * | 9/1989 | Nemoto | B60N 2/888 297/403 |
| 5,738,407 A | * | 4/1998 | Locke | B60R 21/207 280/730.1 |
| 5,842,738 A | * | 12/1998 | Knoll | B60R 21/207 297/216.12 |
| 6,199,900 B1 | * | 3/2001 | Zeigler | B60R 21/207 280/735 |
| 6,474,733 B1 | * | 11/2002 | Heilig | B60R 21/207 297/216.12 |
| 6,568,754 B1 | | 5/2003 | Norton et al. | |
| 7,048,334 B2 | | 5/2006 | Pal et al. | |
| 7,150,468 B2 | * | 12/2006 | Pan | B60R 21/207 280/730.1 |
| 7,748,736 B2 | | 7/2010 | Turner et al. | |
| 8,894,142 B2 | | 11/2014 | Alexander et al. | |
| 9,156,426 B1 | * | 10/2015 | Faruque | B60R 21/207 |
| 9,340,131 B1 | | 5/2016 | Kolich et al. | |
| 9,446,694 B2 | | 9/2016 | Szczygiel et al. | |
| 9,713,974 B2 | | 7/2017 | Mussi et al. | |
| 2016/0129815 A1 | * | 5/2016 | Kolich | B60N 2/914 297/391 |
| 2018/0154810 A1 | * | 6/2018 | Flynn | B60N 2/868 |
| 2018/0178696 A1 | * | 6/2018 | Dexter | B60N 2/821 |

\* cited by examiner

*Primary Examiner* — Chi Q Nguyen

(57) ABSTRACT

A vehicle seat includes a head restraint with a head restraint support connected to a vehicle seat back and the head restraint is configurable in a stowed configuration having a size that is smaller than a deployed configuration.

9 Claims, 8 Drawing Sheets

VEHICLE SEAT INCLUDING A HEAD RESTRAINT INCORPORATING DEPLOYABLE PILLOW

FIELD

The present disclosure relates to a vehicle seat including a vehicle head restraint incorporating a deployable pillow.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Conventional vehicles incorporate seats which are designed to provide a comfortable seating position to occupants while those vehicles are operating to transport the occupants to their travel destination. These occupants generally need to be actively paying attention to the vehicle, especially the driver, because these vehicles require the driver to be actively engaged with the vehicle during operation. With the advent of and increasing penetration of autonomous features in vehicles, the requirement for occupants to be actively engaged with the vehicle may be relaxed. In particular, for an autonomous vehicle, the occupants may be completely disengaged from interaction with the vehicle. In those instances, an occupant may want to establish a more relaxed position in the vehicle and even may desire to take a nap during a trip. Conventional vehicle seats do not provide the ability for an occupant to achieve a comfortable enough position while the vehicle is operating or even to relax sufficiently between trips, if so desired.

SUMMARY

In an exemplary aspect, a vehicle seat includes a head restraint that includes a head restraint support connected to a vehicle seat back and the head restraint is configurable in a stowed configuration and in a deployed configuration where the size of the head restraint in the deployed configuration is larger than the size of the head restraint in the stowed configuration.

In another exemplary aspect, the head restraint includes a deployable pillow that is stowed within the head restraint in the stowed configuration and which is inflatably deployable to increase the size of the head restraint to the deployed configuration.

In another exemplary aspect, the air channel may draw a vacuum to pull air out of the deployable pillow to configure the pillow into the stowed configuration.

In another exemplary aspect, the deployable pillow includes an inflatable bellows laterally positioned between side sections.

In another exemplary aspect, a front face of the head restraint includes laterally sliding sections each slidably connected to a rear section of the head restraint by a sliding track.

In another exemplary aspect, the deployable pillow is centrally positioned between the laterally sliding sections and the rear section.

In another exemplary aspect, the head restraint further includes an air channel in communication with the deployable pillow to provide air with which the deployable pillow may be inflated to the deployed configuration and deflated to the stowed configuration.

In another exemplary aspect, the head restraint further includes a forward pivotal section that is pivotally connected by a pivot to a rear section.

In another exemplary aspect, the deployable pillow is centrally positioned between the forward pivotal section and the rear section.

In another exemplary aspect, the head restraint further includes an air channel in communication with the deployable pillow to provide air with which the deployable pillow may be inflated to the deployed configuration and deflated to the stowed configuration.

In another exemplary aspect, the head restraint further includes a spring-loaded door that is pivotally connected to an underside of the head restraint.

In another exemplary aspect, the head restraint defines an internal pillow cavity that receives the deployable pillow and which is at least partially defined by the spring-loaded door.

In another exemplary aspect, the head restraint is configured to transition between the stowed configuration in which the deployable pillow is contained entirely within the internal pillow cavity and the deployed configuration in which the deployable pillow is inflated to be positioned in front of a forward-facing surface of the head restraint.

In another exemplary aspect, the head restraint further includes a rear section that is slidably connected to a forward section of the head restraint.

In another exemplary aspect, the rear section and the forward section define an internal pillow cavity between them and wherein the deployable pillow is entirely contained within the internal pillow cavity in a stowed configuration.

In another exemplary aspect, the head restraint is configured to transition between the stowed configuration in which the deployable pillow is contained entirely within the internal pillow cavity and the deployed configuration in which the deployable pillow is inflated to be positioned in front of a forward-facing surface of the head restraint.

In another exemplary aspect, the head restraint further includes a front section that is slidably connected to a rear section of the head restraint and which defines an internal pillow cavity between the front section and the rear section that entirely contains the deployable pillow in the stowed configuration.

In another exemplary aspect, the head restraint is configured to transition between the stowed configuration in which the deployable pillow is contained entirely within the internal pillow cavity and the deployed configuration in which the deployable pillow is inflated to be positioned in front of a forward-facing surface of the head restraint.

In another exemplary aspect, the head restraint further includes laterally-positioned, side wing sections that are each pivotally connected to a center section of the head restraint.

In another exemplary aspect, the deployable pillow is positioned on a forward-facing surface of one of the laterally-positioned, side wing sections and the center section when in the deployed configuration.

In another exemplary aspect, the head restraint is configured to transition between the stowed configuration in which the laterally-positioned, side wing sections are positioned on opposing lateral sides of the center section and the deployable pillow is deflated and the deployed configuration in which the laterally-positioned, side wings are pivoted forward and the deployable pillow is inflated.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
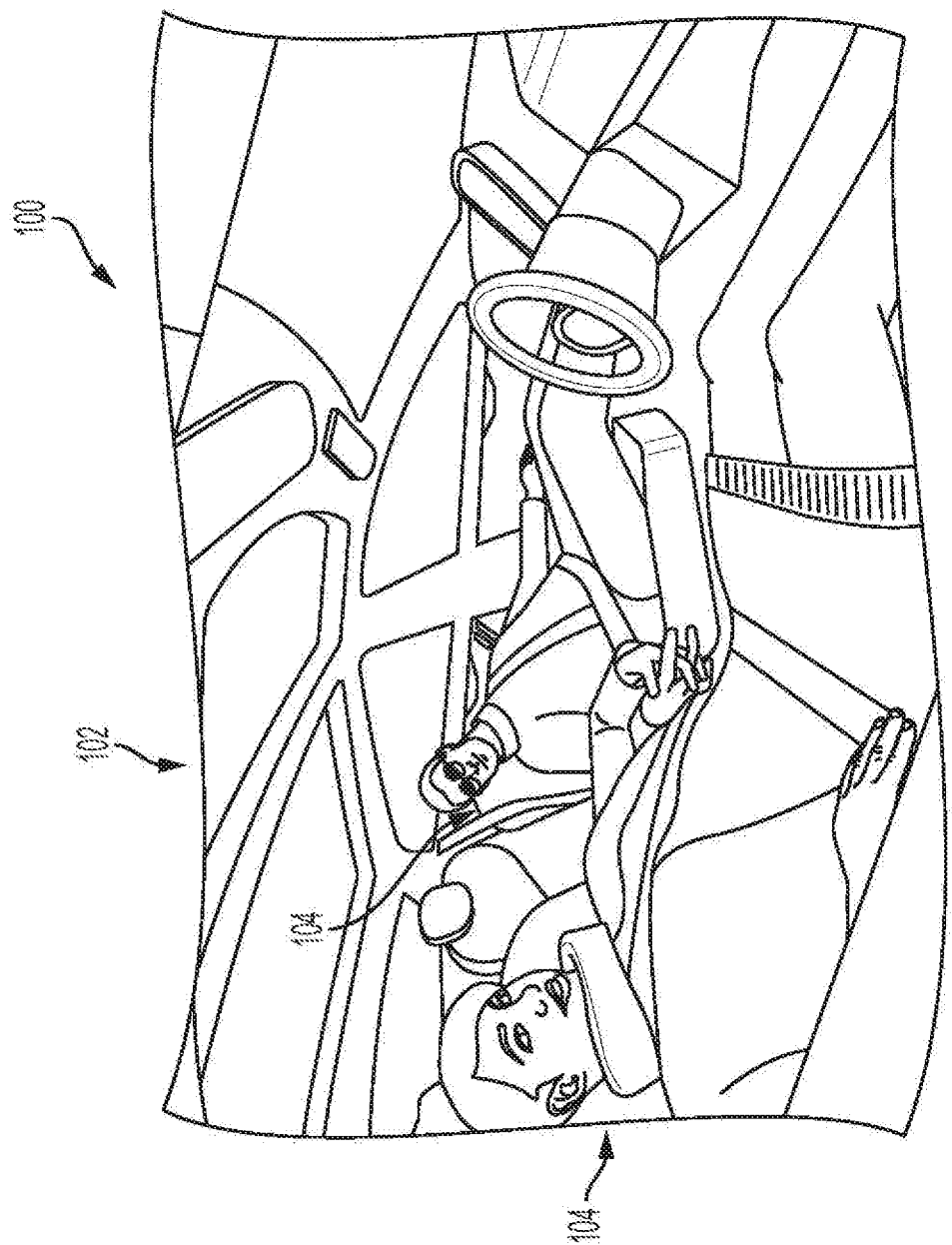
FIG. 1 is a perspective view of a vehicle cabin incorporating vehicle seats having deployable pillows in accordance with an exemplary embodiment of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

FIG. 1 is a perspective view of a vehicle cabin 100 of a vehicle 102 incorporating vehicle seats 104 having deployable pillows in accordance with an exemplary embodiment of the present disclosure. In the instance illustrated in FIG. 1, the vehicle 102 is operating in a fully autonomous mode in which the occupants of the vehicle are not required to engage with the vehicle. While in the fully autonomous mode, the occupants may recline the vehicle seats and deploy pillows from a head restraint which increases the comfort of the occupants.

Figure 3:
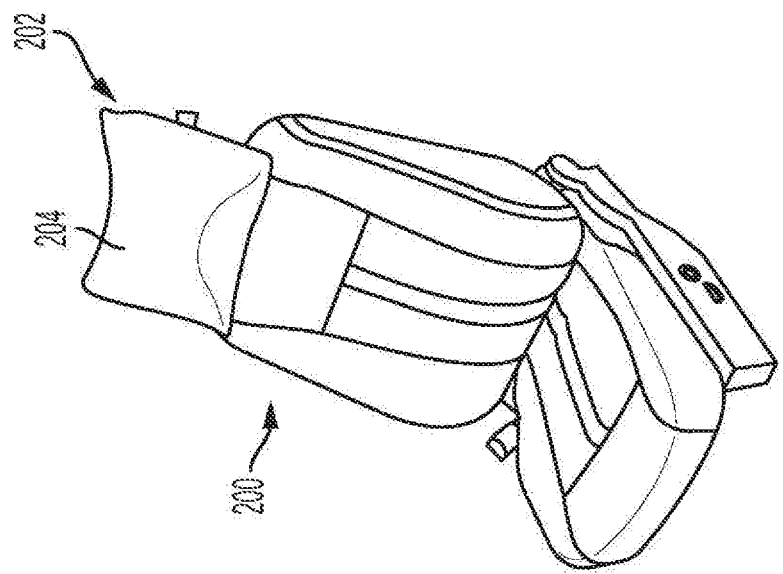
FIG. 3 illustrates a perspective view of the vehicle seat of FIG. 2 in a pillow deployed configuration.
Figure 2:
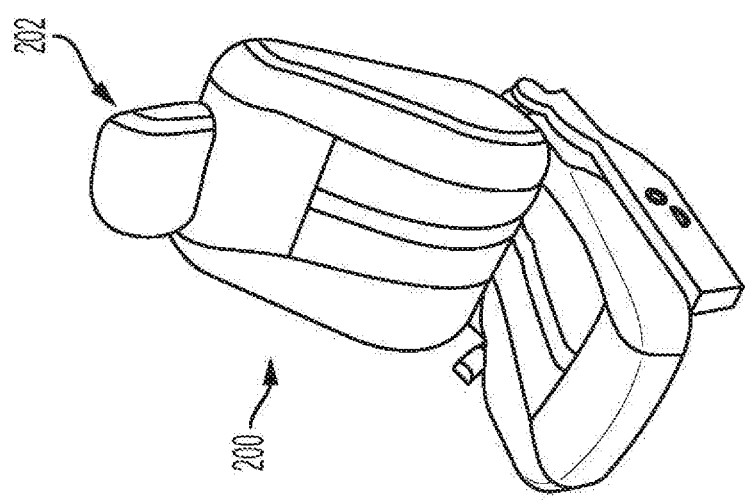
FIG. 2 illustrates a perspective view of an exemplary embodiment of a vehicle seat incorporating a pillow that is deployable from a head restraint in a pillow stowed configuration.

FIGS. 2 and 3 illustrate perspective views of an exemplary embodiment of a vehicle seat 200 incorporating a pillow 204 that is deployable from a head restraint 202. FIG. 2 illustrates the vehicle seat 200 with the head restraint 202 in a pillow 204 stowed configuration and FIG. 3 illustrates the vehicle seat 200 with the head restraint 202 in a pillow 204 deployed configuration. It is to be understood that, in an exemplary embodiment, the head restraint may be repositioned to accommodate occupant comfort while in either of the stowed and/or deployed configurations.

Figure 4:
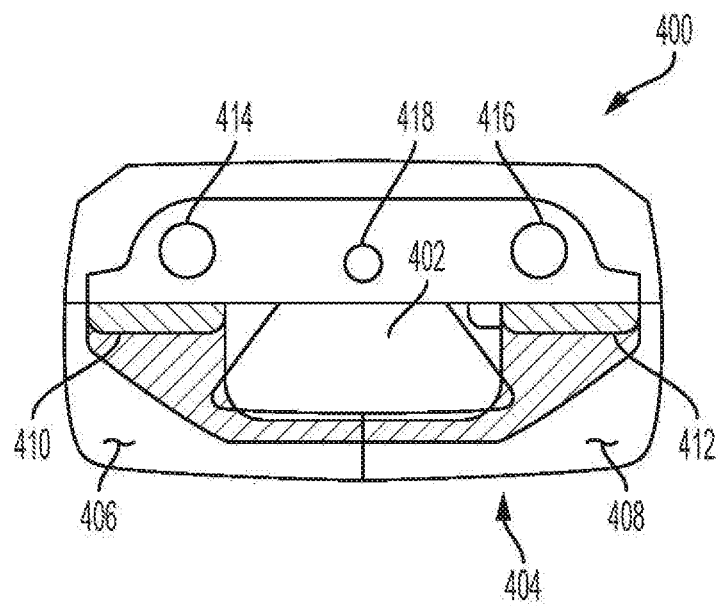
FIG. 4 illustrates a cross-sectional plan view of an exemplary head restraint incorporating a deployable pillow in accordance with the present disclosure.

FIG. 4 illustrates a cross-sectional plan view of an exemplary head restraint 400 incorporating a deployable pillow 402 in accordance with the present disclosure. The cross-sectional view of FIG. 4 is taken from above a horizontal planar cross-section of the head restraint 400. The head restraint 400 includes a front face 404 which is divided into two sliding sections 406 and 408. Each of the two sliding sections 406 and 408 are connected to the head restraint 400 by corresponding sliding tracks 410 and 412, respectively. The head restraint 400 further includes a deployable pillow 402 which is illustrated in a stowed configuration behind the sliding sections 406 and 408. FIG. 4 further illustrates head restraint posts 414 and 416 which connect to the seat back (not illustrated) of the vehicle seat in a conventional manner and which provide support for the head restraint 400 on the seat back. The head restraint 400 further includes an air channel 418 which is operatively connected to the deployable pillow 402 in a manner to selectively provide air with which the pillow 402 may be inflated and expand into a deployed configuration which increases the comfort of the occupant of the vehicle seat. The head restraint 400 may be reconfigured into the pillow 402 deployed configuration (not illustrated) from the stowed configuration (as illustrated in FIG. 4) by the sliding sections 406 and 408 sliding along sliding tracks 410 and 412, respectively, in order to separate and provide a gap in the forward face of the head restraint through which the deployable pillow 402 may deploy when provided a source of inflating air from the air channel 418. Reconfiguring the head restraint 400 from the pillow deployed configuration back to the stowed configuration (as illustrated in FIG. 4) may be easily accomplished by reversing this process. For example, the deployable pillow 402 may be deflated and/or a vacuum may be drawn within the pillow such that it is pulled back into the stowed configuration by exhausting air from the pillow 402 through the air channel 418. The sliding sections 406 and 408 may then slide back together along sliding tracks 410 and 412, respectively. In an alternative, exemplary embodiment of the present disclosure, the air channel may be positioned in one or more of the head restraint posts.

Figure 5:
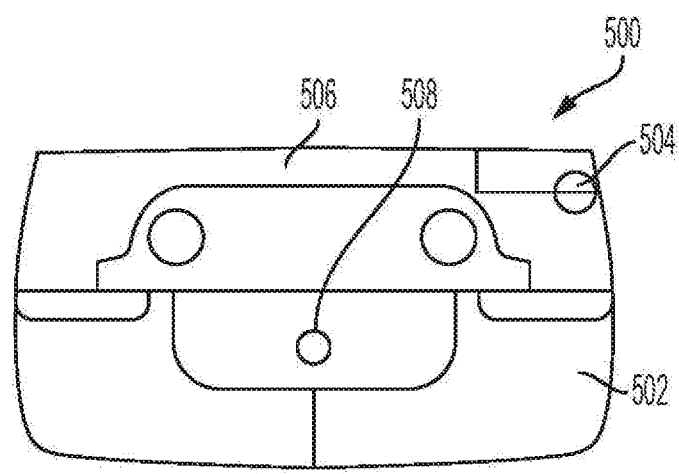
FIG. 5 illustrates a cross-sectional plan view of another exemplary head restraint in accordance with the present disclosure.

FIG. 5 illustrates a cross-sectional plan view of another exemplary head restraint 500 in accordance with the present disclosure. The head restraint 500 includes a forward pivotal section 502 which is connected by a pivot 504 to a rear section 506. The head restraint 500 further includes a deployable pillow 508 which may be operably connected to an air supply system (not shown) for selectively inflating the pillow 508 for deployment and/or for deflating the pillow 508 for positioning the pillow 508 in the stowed configuration as illustrated in FIG. 5. To transition from the pillow stowed configuration that it illustrated in FIG. 5 to a pillow deployed position, the forward pivotal section 502 may be pivoted about pivot 504 which then provides an opening into which the pillow 508 may inflate and thereby improve the comfort of the occupant of the seat incorporating the head restraint 500.

Figure 7:
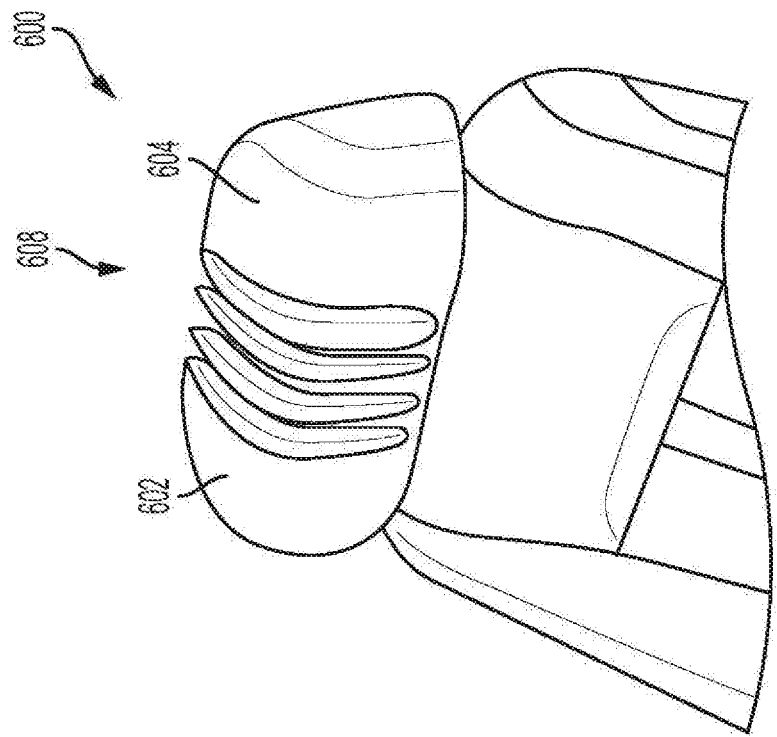
FIG. 7 illustrates another perspective view of the vehicle seat of FIG. 6 in a deployed configuration.
Figure 6:
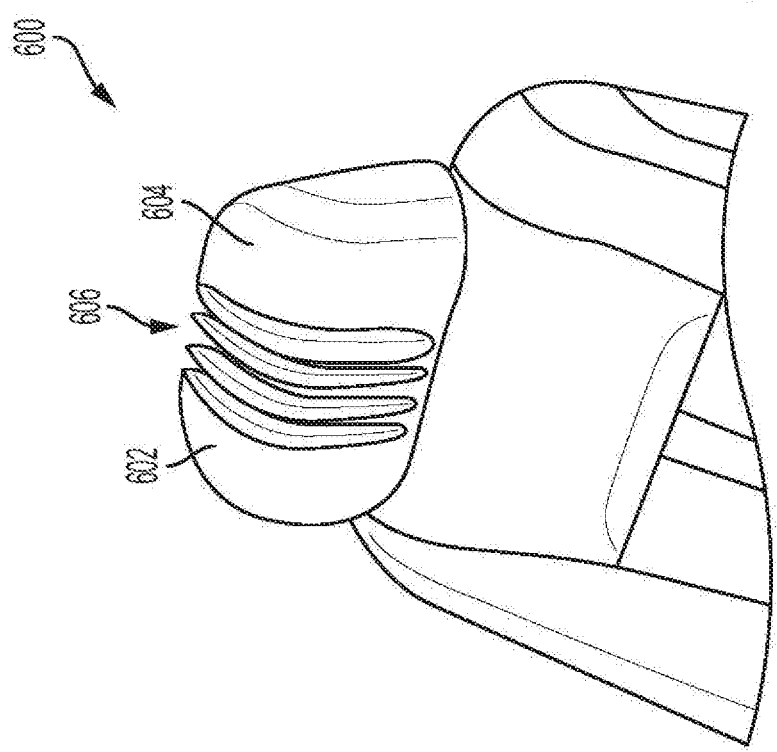
FIG. 6 illustrates a perspective view of yet another exemplary embodiment of a vehicle seat incorporating a head restraint in a stowed configuration.

FIGS. 6 and 7 illustrate yet another exemplary embodiment of a head restraint 600 in accordance with the present disclosure. The head restraint 600 is defined by two sections 602 and 604 which, in the fully stowed position (not illustrated), directly contact each other along the dividing line between them. Between the two sections 602 and 604 the head restraint 600 further includes an inflatable bellows section 606 which provides comfortable support to an occupant and which further operates to selectively drive the sections 602 and 604 away from each other when the bellows 606 is inflated and to bring the sections 602 and 604 back together when the bellows 606 deflate. In this manner, by selectively inflating and/or deflating the bellows section 606 an occupant may increase the size of the head restraint and thereby improve the surface area and comfort.

Figure 8:
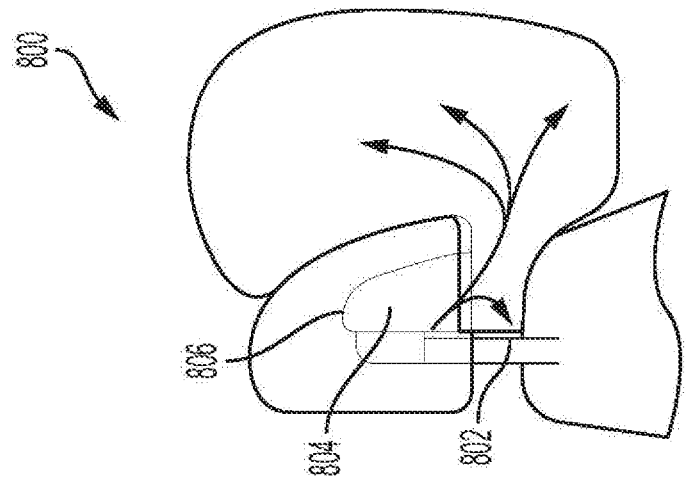
FIG. 8 illustrates a cross-sectional elevation view of another vehicle seat with a deployable pillow in accordance with an exemplary embodiment of the present disclosure.

FIG. 8 illustrates an elevational cross-section view of a head restraint 800 in accordance with an exemplary embodiment of the present disclosure. The head restraint 800 includes a spring-loaded door 802 that is pivotally connected to the head restraint and a deployable pillow 804. FIG. 8 illustrates the head restraint 800 in a pillow deployed configuration in which the pillow 804 is inflated and deployed to provide an increased level of comfort to an occupant. In a stowed configuration (not illustrated) the pillow 804 is deflated and fits within a pillow cavity 806 within the head restraint 800. To transition from the stowed configuration to the deployed configuration (as illustrated by FIG. 8) air may be selectively provided to the inflatable pillow 804 which causes the pillow 804 to expand and push the spring-loaded door 802 open. The pillow 804 continues to inflate to assume the general shape illustrated in FIG. 8. To transition from the deployed configuration to the stowed configuration, an air supply system may remove air from the pillow 804 which thereby deflates the pillow 804 until it is snugly stowed within the pillow cavity 806 and the spring-loaded door 802 may then close. In this manner, by selectively controlling the supply of air to the pillow an occupant may dramatically improve the comfort of the vehicle seat.

Figure 9:
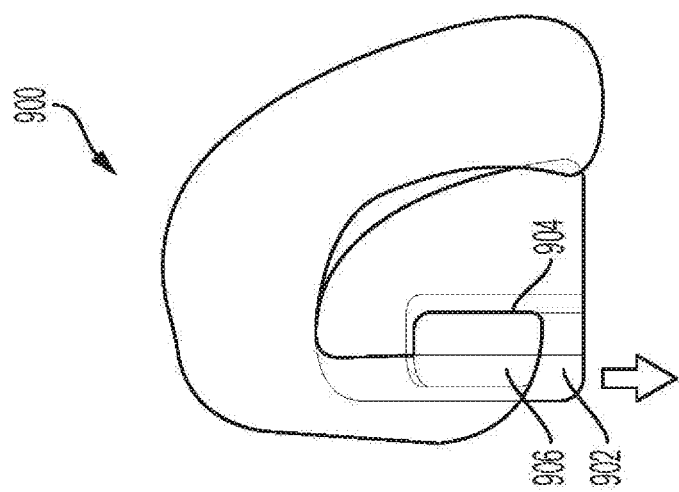
FIG. 9 illustrates a cross-sectional elevation view of another vehicle seat with a deployable pillow in accordance with an exemplary embodiment of the present disclosure.

FIG. 9 illustrates an elevational cross-section view of a head restraint 900 in accordance with an exemplary embodiment of the present disclosure. The head restraint 900 includes a rear section 902 which is slidably connected to a forward section of the head restraint 900. The head restraint 900 defines a pillow cavity 904 in which a deployable pillow 906 may be stowed. To transition from the stowed configuration, the rear section 902 may slide downward and expose the pillow 906 which may then be provided with a supply of air to inflate the pillow 906 to the deployed configuration illustrated in FIG. 9. To transition from the deployed configuration to the stowed configuration, the air supply system may remove air from the pillow 906 which then causes the pillow 906 to deflate and to return to the stowed configuration within the pillow cavity 904 and the rear section 902 may then slide back upward to contain the pillow 906 within the head restraint 900.

Figure 10:
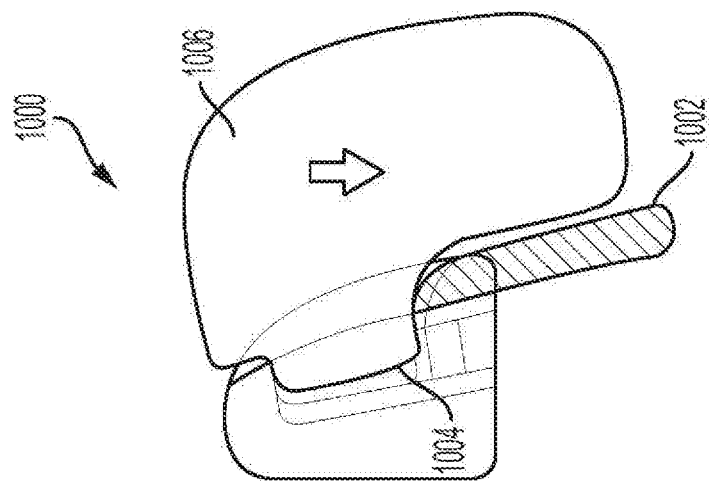
FIG. 10 illustrates a cross-sectional elevation view of another vehicle seat with a deployable pillow in accordance with an exemplary embodiment of the present disclosure.

FIG. 10 illustrates an elevational cross-section view of a head restraint 1000 in accordance with an exemplary embodiment of the present disclosure. The head restraint 1000 includes a front section 1002 which is slidably connected to a rear section of the head restraint 1000. The head restraint 1000 defines a pillow cavity 1004 in which a deployable pillow 1006 may be stowed. To transition from the stowed configuration, the front section 1002 may slide downward and expose the pillow 1006 which may then be provided with a supply of air to inflate the pillow 1006 to the deployed configuration illustrated in FIG. 10. To transition from the deployed configuration to the stowed configuration, the air supply system may remove air from the pillow 1006 which then causes the pillow 1006 to deflate and to return to the stowed configuration within the pillow cavity 1004 and the rear section 1002 may then slide back upward to contain the pillow 1006 within the head restraint 1000. In an alternative embodiment, the front section 1002 may slide upward to expose the pillow 1006 to permit the pillow to transition from the stowed configuration into the deployed configuration and that, after the pillow returns to the stowed configuration, the front section 1002 may slide downward to contain the pillow 1006 within the head restraint.

Figure 12:
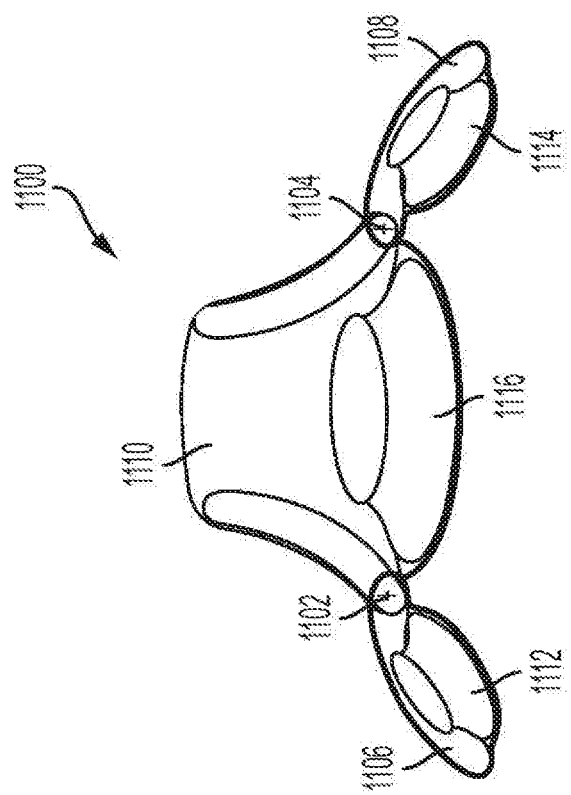
FIG. 12, illustrates a cross-sectional plan view of the head restraint of FIG. 11 in a deployed configuration.
Figure 11:
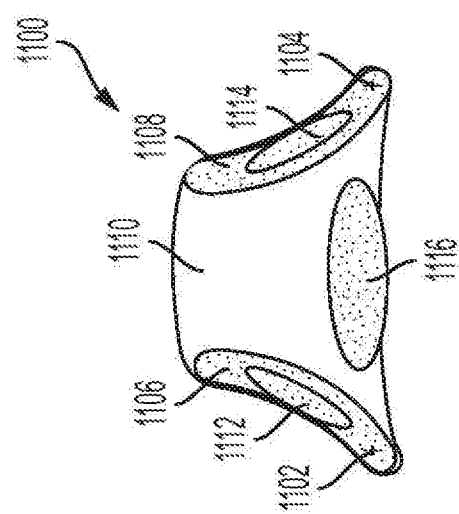
FIG. 11 illustrates a cross-sectional plan view of a head restraint in a stowed configuration in accordance with another exemplary embodiment of the present disclosure.

FIGS. 11 and 12 illustrate a top down perspective on a cross-section of a head restraint 1100 in a pillow stowed configuration in FIG. 11 and in a pillow deployed configuration in FIG. 12. The head restraint 1100 includes pivots 1102 and 1104 which pivotally connect wing sections 1106 and 1108, respectively to the center section 1110 of the head restraint 1100. Each of the wing sections 1106 and 1108 may each include an inflatable bladder 1112 and 1114, respectively. A forward facing surface of the center section 1110 may also include an inflatable bladder 1116. To transition from the stowed configuration illustrated in FIG. 11 to the deployed configuration of FIG. 12, each of the wing sections 1106 and 1108 may each be pivotally rotated forward about pivots 1102 and 1104, respectively. Each of the inflatable bladders 1112, 1114, and 1116 may then be adjustably provided with a supply of air to inflate each of the bladders to a shape and resiliency controlled by the occupant of the seat incorporating the head restraint 1100.

Figure 14:
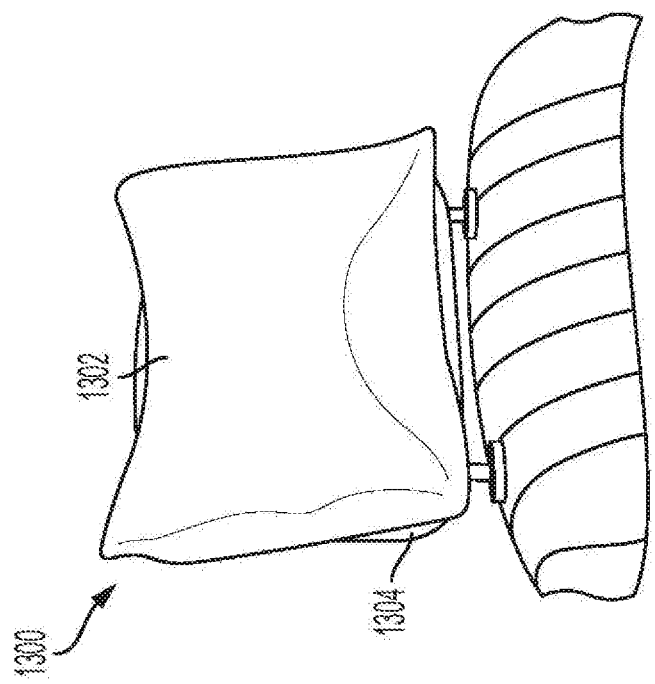
FIG. 14 illustrates a perspective view of the embodiment of FIG. 13 in the pillow deployed configuration.
Figure 13:
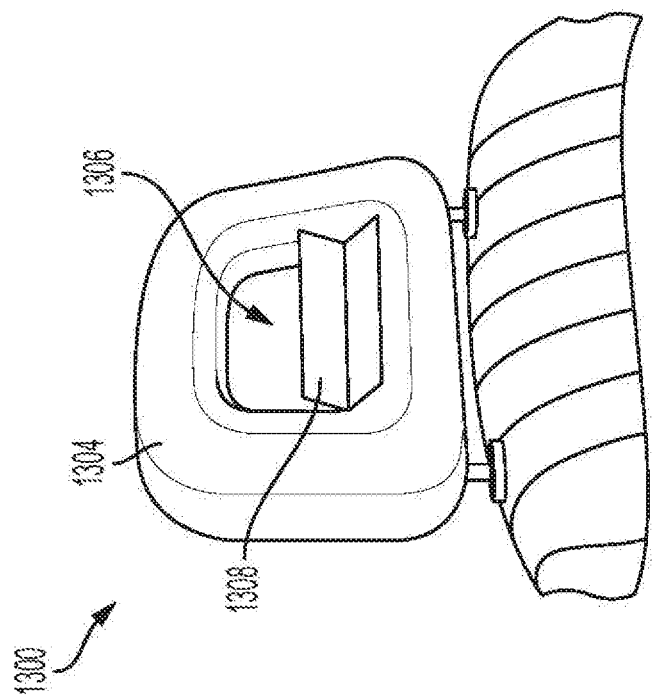
FIG. 13 illustrates a perspective view of another exemplary embodiment of a vehicle seat incorporating a pillow that is deployable from a head restraint in a pillow stowed configuration.

FIG. 13 illustrates a perspective view of another exemplary embodiment of a vehicle seat 1300 incorporating a pillow 1302 that is deployable from a head restraint 1304 in a pillow stowed configuration and FIG. 14 illustrates a perspective view of the head restraint 1304 with the pillow 1302 in a deployed configuration. The head restraint 1304 may be of a fixed and/or an adjustable type of head restraint with an open central area 1306. A surface of the head restraint that faces upward toward the open central area 1306 incorporates a door 1308 which at least partially defines an internal cavity in which the pillow 1302 is retained while in the stowed configuration. During a transition between the stowed configuration and the deployed configuration, the door 1308 may pivot upwardly to permit the pillow 1302 to inflatably expand to the deployed configuration as illustrated in FIG. 14. Transitioning from the deployed configuration to the stowed configuration may be achieved by pulling a vacuum on the pillow 1302 to remove air from it which then enables the pillow 1302 to retract back into the internal cavity, which permits the door 1308 to close and achieve the stowed configuration.

Figure 16:
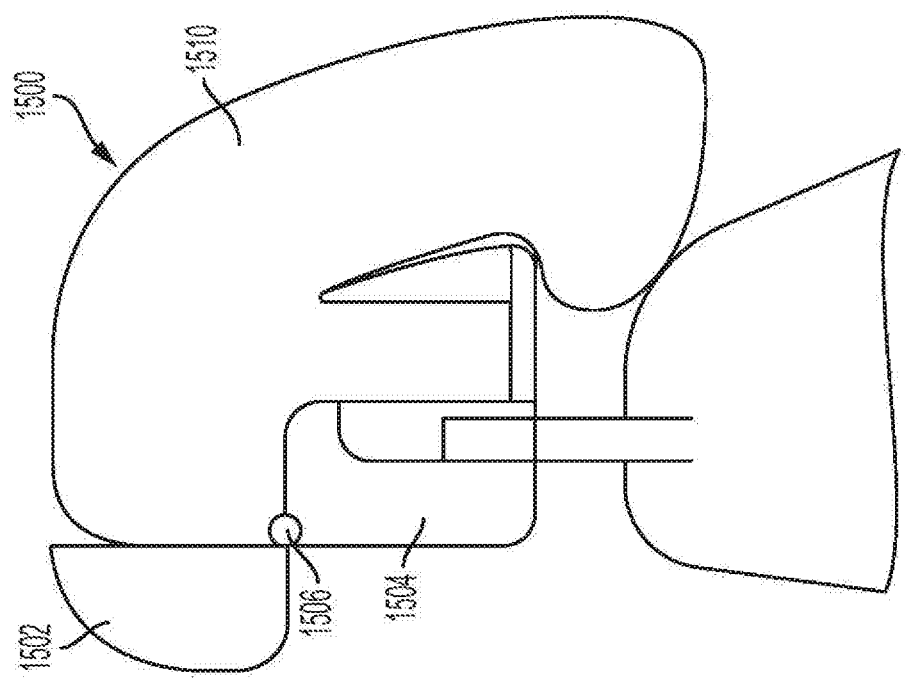
FIG. 16, illustrates a cross-sectional side elevational view of the head restraint of FIG. 15 in a deployed configuration.
Figure 15:
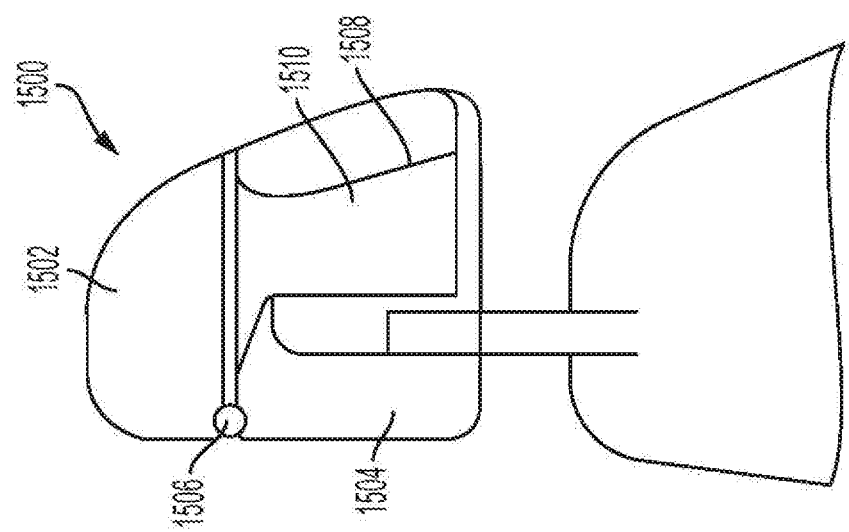
FIG. 15 illustrates a cross-sectional side elevational view of a head restraint in a stowed configuration in accordance with another exemplary embodiment of the present disclosure.

FIG. 15 illustrates a cross-sectional side elevational view of a head restraint 1500 in a stowed configuration in accordance with another exemplary embodiment of the present disclosure and FIG. 16 illustrates a cross-sectional side elevational view of the head restraint 1500 in a deployed configuration. The head restraint 1500 includes an upper portion 1502 that is pivotally attached to a lower portion 1504 via a pivot 1506. The upper portion 1502 and the lower portion 1504 together define an internal cavity 1508 that retains an inflatable pillow 1510 when in the stowed configuration as illustrated in FIG. 15. In a transition from the stowed configuration to the deployed configuration, the upper portion 1502 may pivot backward which allows the pillow 1510 to be inflated to the deployed configuration as illustrated in FIG. 16. To transition from the deployed configuration to the stowed configuration, a vacuum may be drawn on the pillow 1510 to deflate the pillow 1510 and to return it into the internal cavity 1508 and the upper portion 1502 may then pivot forward and fully enclose the pillow 1510 within the internal cavity 1508.

While the exemplary embodiments included in this document illustrate head restraints which may be modular and separable from a seat back, it is understood that the present invention is equally applicable and includes head restraints which may be integrated into a seat back.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle seat including a head restraint, comprising:
a head restraint support connected to a vehicle seat back; and
a head restraint supported by the head restraint support, wherein the head restraint is configurable in a stowed configuration and in a deployed configuration, wherein a size of the head restraint in the deployed configuration is larger than the size of the head restraint in the stowed configuration, wherein the head restraint comprises a deployable pillow that is stowed within the head restraint in the stowed configuration and wherein the deployable pillow is inflatably deployable to increase the size of the head restraint to the deployed configuration, and wherein a front face of the head restraint comprises laterally sliding sections each slidably connected to a rear section of the head restraint by a sliding track.

2. The vehicle seat of claim 1, wherein the deployable pillow is centrally positioned between the laterally sliding sections and the rear section.

3. The vehicle seat of claim 2, wherein the head restraint further comprises an air channel in communication with the deployable pillow to provide air with which the deployable pillow may be inflated to the deployed configuration and deflated to the stowed configuration.

4. The vehicle seat of claim 3, wherein the air channel may draw a vacuum to pull air out of the deployable pillow to configure the pillow into the stowed configuration.

5. The vehicle seat of claim 1, wherein the head restraint further comprises a front section that is slidably connected to a rear section of the head restraint and which defines an internal pillow cavity between the front section and the rear section that entirely contains the deployable pillow in the stowed configuration.

6. The vehicle seat of claim 5, wherein the head restraint is configured to transition between the stowed configuration in which the deployable pillow is contained entirely within the internal pillow cavity and the deployed configuration in which the deployable pillow is inflated to be positioned in front of a forward-facing surface of the head restraint.

7. A vehicle seat including a head restraint, comprising:
a head restraint support connected to a vehicle seat back; and
a head restraint supported by the head restraint support, wherein the head restraint is configurable in a stowed configuration and in a deployed configuration, wherein a size of the head restraint in the deployed configuration is larger than the size of the head restraint in the stowed configuration, wherein the head restraint comprises a deployable pillow that is stowed within the head restraint in the stowed configuration and wherein the deployable pillow is inflatably deployable to increase the size of the head restraint to the deployed configuration, and wherein the head restraint further comprises a rear section that is slidably connected to a forward section of the head restraint.

8. The vehicle seat of claim 7, wherein the rear section and the forward section define an internal pillow cavity between the rear section and the forward section and wherein the deployable pillow is entirely contained within the internal pillow cavity in a stowed configuration.

9. The vehicle seat of claim 8, wherein the head restraint is configured to transition between the stowed configuration in which the deployable pillow is contained entirely within the internal pillow cavity and the deployed configuration in which the deployable pillow is inflated to be positioned in front of a forward-facing surface of the head restraint.

* * * * *